United States Patent
Al et al.

[11] Patent Number: 5,827,116
[45] Date of Patent: Oct. 27, 1998

[54] APPARATUS FOR FILLETING THE BREAST PIECE OF SLAUGHTERED POULTRY

[75] Inventors: Gert-Jan Al; Maarten Bakker, both of Oostzaan, Netherlands

[73] Assignee: Machinefabriek Meyn B.V., Oostzaa, Netherlands

[21] Appl. No.: 827,921

[22] Filed: Apr. 8, 1997

[30] Foreign Application Priority Data

Apr. 10, 1996 [NL] Netherlands ............................ 1002831

[51] Int. Cl.⁶ .................................................. A22C 21/00
[52] U.S. Cl. ........................... 452/170; 452/136; 452/155
[58] Field of Search .................................... 452/170, 136, 452/135, 155, 156

[56] References Cited

U.S. PATENT DOCUMENTS

| 3,130,445 | 4/1964 | Segur. | |
|---|---|---|---|
| 4,562,613 | 1/1986 | Lewis | 452/170 |
| 4,951,354 | 8/1990 | Callsen et al.. | |
| 5,071,388 | 12/1991 | Lindert et al. | 452/170 |
| 5,314,374 | 5/1994 | Koch et al. | 452/136 |
| 5,374,214 | 12/1994 | Martin et al. | 452/170 |
| 5,545,083 | 8/1996 | Bargelé et al.. | |
| 5,562,532 | 10/1996 | Horst et al. | 452/136 |
| 5,618,230 | 4/1997 | Bargelé et al. | 452/170 |
| 5,643,074 | 7/1997 | Linnenbank. | |
| 5,697,837 | 12/1997 | Verrijp et al. | 452/170 |

FOREIGN PATENT DOCUMENTS

| 0336162A1 | 10/1989 | European Pat. Off.. |
|---|---|---|
| 0678243A1 | 10/1995 | European Pat. Off.. |
| 9401198 | 3/1996 | Netherlands. |
| 9401773 | 6/1996 | Netherlands. |

OTHER PUBLICATIONS

Netherland Search Report, Dec. 16, 1996.

*Primary Examiner*—Willis Little
*Attorney, Agent, or Firm*—Dority & Manning

[57] ABSTRACT

An apparatus for filleting the breast piece of slaughtered poultry includes a device for supporting and conveying the breast piece in a conveying direction along a conveying path. A device is included for cutting the breast meat loose from the breast piece from the sternum and wishbone of the breast piece. The cutting device includes a substantially v-shaped device which is driven synchronously with the breast piece along at least a portion of the conveying path. The v-shaped device engages the breast piece and separates the breast meat adjacent the wishbone.

10 Claims, 2 Drawing Sheets

APPARATUS FOR FILLETING THE BREAST PIECE OF SLAUGHTERED POULTRY

BACKGROUND OF THE INVENTION

The present invention relates to an apparatus for filleting the breast piece of slaughtered poultry, which breast piece at least comprises the sternum and the wishbone defined by both clavicles, with means for supporting and conveying the breast piece and with cutting means for cutting loose the breast meat from the sternum and wishbone.

When, using a known apparatus, the breast meat is cut loose from the sternum and the wishbone, it often appears that bone fragments are present in the severed breast meat. There are several reasons for the presence of such bone fragments.

It should be noted that the bone fragments primarily originate from the wishbone. The poultry, from which the breast piece originates, primarily comprise young chickens which are not yet fully grown. As a result, during a number of stages from living chicken towards completed end product, bone fractures may occur. When catching the chickens, fractures may occur in the not yet fully grown wishbone because the chickens frantically flap their wings. Also while stunning, prior to slaughtering, shock-like muscle tensions sometimes cause undesired bone fractures. The following plucking of slaughtered chickens using mechanized plucking fingers define another source of bone fractures. Finally, bone fractures may be caused by the use of automated ready-to-cook machines which make the slaughtered chicken ready to cook. Eviscerators also belong to this category of machines.

OBJECTS AND SUMMARY OF THE INVENTION

It is a principal object of the invention to provide an apparatus of the type mentioned before, in which it can be avoided effectively that bone fragments are present in the breast meat and cut loose. Additional objects and advantages of the invention will be set forth in part in the following description, or may be obvious from the description, or may be learned through practice of the invention.

Thus, according to the invention, the apparatus is characterized in that the cutting means comprise a cutting device having a V-shape which basically corresponds with the outermost boundary of the wishbone, wherein said cutting device is driven such that it severs the breast meat from the wishbone closely adjacent said outermost boundary and, as seen in the direction of conveyance of the apparatus, moves along substantially synchronously with the breast piece while severing. With such a cutting device, the connection between the wishbone and surrounding breast meat can be severed effectively in such a way that during the following filleting of the breast piece, the breast meat is removed and the wish bone stays behind, wherein further possible bone fragments stay behind together with said wishbone and thus the removed breast meat is fully free of bone fragments.

It is noted that, as a result of the substantially synchronous motion of breast piece and cutting device, strictly speaking, punching or pressing occurs rather than cutting. For, during functioning, the cutting device merely moves up and down substantially perpendicularly to the breast piece, whereas a relative longitudinal motion as a result of the synchronous motion is avoided.

Within the scope of the invention a number of possibilities exist for realizing the cutting device. A first embodiment is characterized in that the cutting device has two parts which are not connected at the tip of the V. With this device, when the cutting device has carried out its function, initially a connection occurs between the breast meat and the tip of the wishbone. Only during the following filleting is the connection severed resulting in two half fillets.

When however, in correspondence with an alternative embodiment, the cutting device comprises a single continuous V-shaped part (such that at the tip of the V the previously mentioned two parts are indeed connected) the breast meat is also already severed by the cutting device at the tip of the wishbone and one single fillet be obtained during filleting.

Whether one chooses a cutting device with two separate parts or a cutting device comprising a single continuous part depends upon the demand from the market, thus whether half fillets or entire fillets are desired.

In accordance with an advantageous embodiment, the substantially synchronous motion of breast piece and cutting device is realized by a cutting device driving apparatus synchronized with the conveying means, offering said cutting device a circular track which along part of its circumference substantially coincides with the track followed by the wishbone.

At the coinciding section of the circumference of the circular track and the track followed by the wishbone, the cutting device and the wishbone merely move substantially perpendicularly to each other and do not move relative to each other in the longitudinal direction, as a result of which the desired punching motion is obtained.

For realizing such a circular track, it is possible, that the driving apparatus comprises two arms rotatable around parallel axes, which are connected by a connecting arm supporting the cutting device. Using this special construction, the cutting device indeed follows a circular track, but always maintains the same spacial position, for example in parallel to the wishbone.

Of course other motion mechanisms are conceivable for realizing that the cutting device moves along synchronously with the breast piece along a part of the track. As an example of such an alternative driving apparatus, a construction is mentioned comprising two linear guidings extending perpendicularly relative to each other.

Often the apparatus according to the invention is of the type in which the supporting means comprise a carriage receiving the breast piece. In such a case, it is advantageous when the carriage carries a centering plate which may engage the breast piece below the wishbone and which at its free end is provided with a recess for receiving a tendon extending in the longitudinal medial plane of the breast piece between the tip of the wishbone and the sternum. By means of this centering plate, the breast piece can be centered correctly; especially this means that the longitudinal medial plane of the breast piece is positioned in parallel to the direction of conveyance of the apparatus, such that the following severing of the breast meat using the cutting device may occur in an optimal manner.

Hereinafter the invention will be elucidated referring to the drawing, in which several embodiments of the apparatus according to the invention are represented.

DETAILED DESCRIPTION OF THE PREFERRED EMBODIMENTS

Figure 1A:
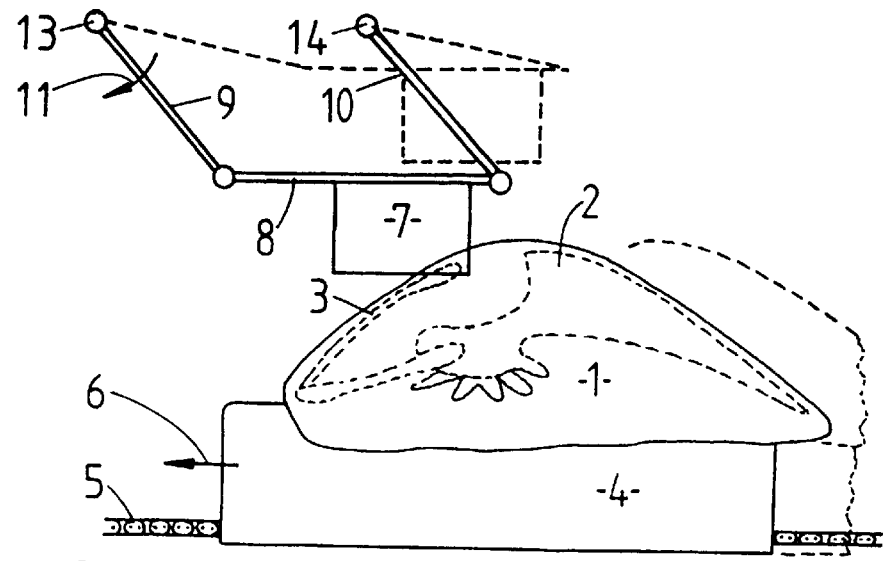
FIG. 1 shows in three stages schematically the operation of an embodiment of the apparatus according to the invention.

Reference will now be made in detail to the presently preferred embodiments of the invention, one or more examples of which are illustrated in the drawings. Each example is provided by way of explanation of the invention, and not as a limitation of the invention. For example, features illustrated or described as part of one embodiment can be used on another embodiment to yield still a further embodiment. It is intended that the present invention cover such modifications and variations.

FIG. 1 shows schematically a side-elevational view of part of an apparatus for filleting the breast piece 1 of slaughtered poultry. The breast piece 1 comprises at least the sternum 2 and the wishbone 3 defined by both clavicles.

The apparatus includes a large number of carriages 4 (of which only one is represented) which, using a driving means 5 (for example and endless chain), follow an endless track. The carriages 4 are meant for supporting and conveying the breast pieces 1.

The direction of conveyance of the breast pieces 1 is indicated by arrow 6 in FIG. 1.

The apparatus includes cutting means for cutting loose the breast meat from the sternum and from the wishbone. As far as said cutting means are of a conventional type, these are not represented in the figures. However, said cutting means also include a cutting device 7 which, as will appear later from FIG. 2

The cutting device is mounted onto a connecting arm 8 which extends between two arms 9 and 10 being rotatable in the direction of arrows 11 and 12 around axes 13 and 14 extending perpendicularly to the plane of the drawing.

The assembly of connecting arm 8, arms 9 and 10, and rotational axes 13 and 14 results in a cutting device driving apparatus 7 which offers said cutting device a circular track. Further, however, the cutting device 7 maintains a fixed spacial orientation.

The motion of the cutting device 7 and the motion of the breast piece 1 are synchronized in such a way that the circular track of the cutting device along part of its circumference basically coincides with the track followed by the wishbone 3. This will be elucidated further referring to FIG. 1a to 1c.

Represented in dotted lines in FIG. 1a is a position, in which the cutting device 7 is at a large distance from the breast piece 1. When the breast piece 1 has reached the position indicated in full lines in FIG. 1a, the cutting device 7 also has reached the position indicated in full lines and has just started engaging the breast meat surrounding the wishbone 3. Due to the synchronization between the cutting device 7 and the breast piece 1, the cutting device 7 substantially merely carries out a perpendicular motion relative to the breast piece 1.

Figure 1B:
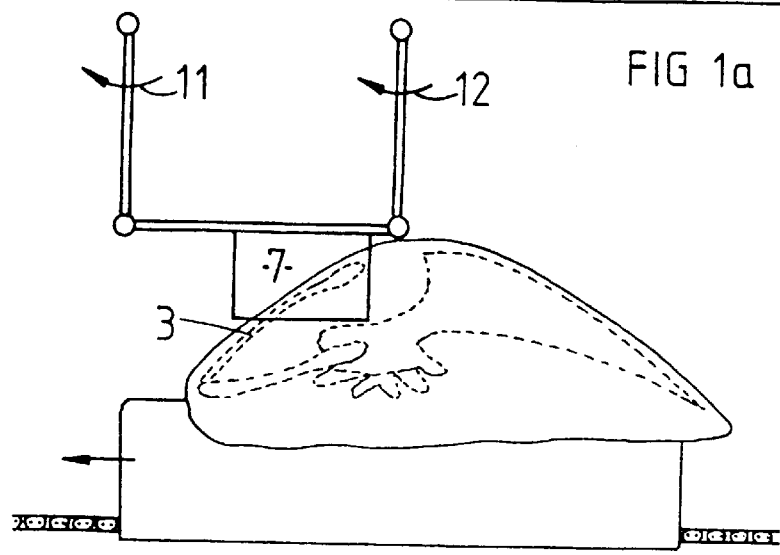

After some time the position illustrated in FIG. 1b is reached, in which the relative longitudinal position of the cutting device 7 in respect of the breast piece 1 basically does not or hardly differs from the position illustrated in FIG. 1a, but wherein the cutting device 7 has reached its maximum depth in the breast piece 1. As a result, the breast meat is cut loose, or better punched free, closely around the wishbone 3.

Figure 1C:
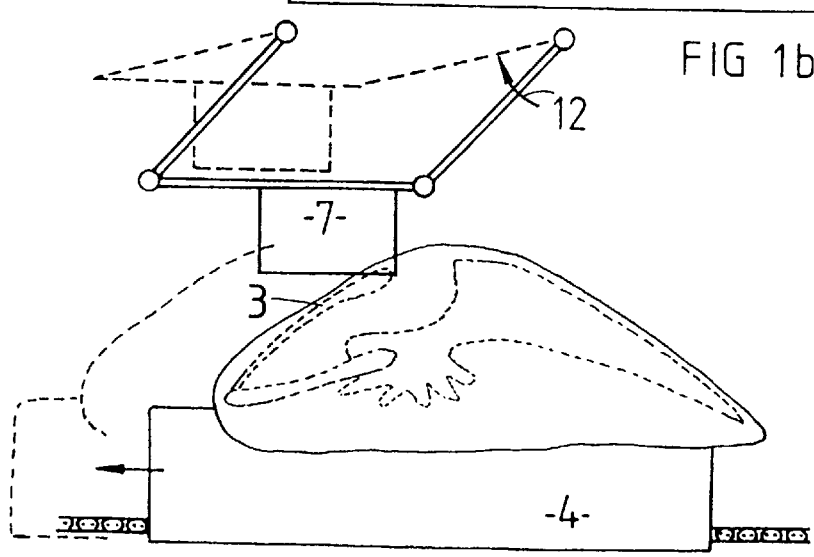

Represented in full lines in FIG. 1c is a position of the breast piece 1 and cutting device 7, respectively, in which these almost are separated again. Next the position partially represented in dotted lines will be reached, in which the cutting device 7 is again distanced from the breast piece 1.

Thereupon the cutting device 7 will fully complete its circular track for again arriving at the position indicated at the right of FIG. 1a at that moment at which the next carriage 4 with breast piece 1 has arrived at that location. Thus successive breast pieces 1 can be processed continuously.

Of course it is possible to realize the synchronous motion of the cutting device 7 and breast piece 1 in other ways than represented. For example, it is conceivable to provide a driving apparatus comprising two perpendicularly positioned linear guidings (for example in parallel to the direction of conveyance of the breast piece and perpendicularly thereto) using which the synchronous motion of the cutting device 7 along part of its track may be generated.

As mentioned before the cutting device 7 with its V-shape closely matches the outermost boundary of the wishbone. In this respect, it is possible that the cutting device has the shape illustrated in FIG. 2a, that is comprising two parts 7a and 7b which are not connected at the tip of the V or, in correspondence with FIG. 2b, comprises a single continuous V-shaped part 7.

Figures 2A, 2B:
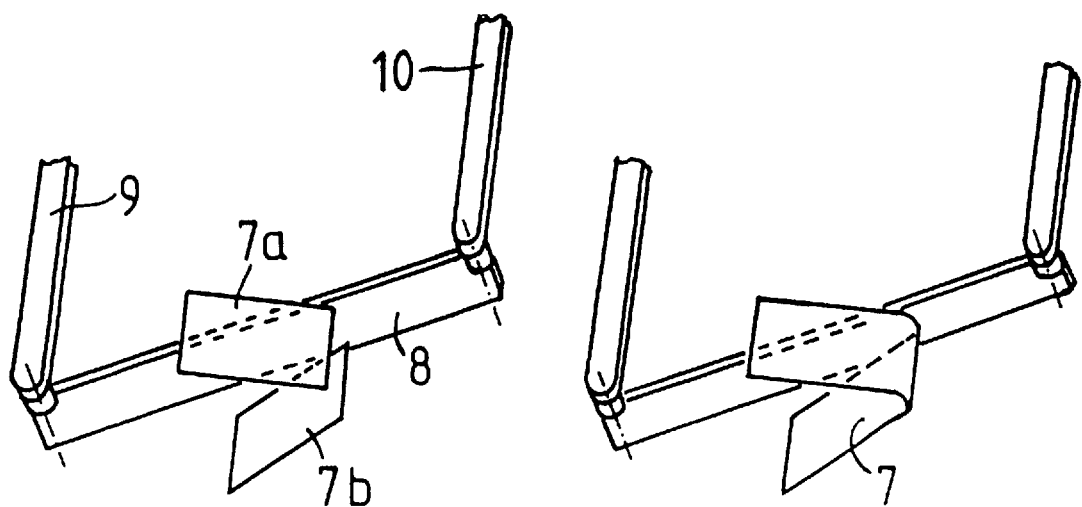
FIG. 2 shows perspectively two embodiments of a cutting device according to the invention.

In the embodiment illustrated in FIG. 2a, initially a connection remains between the tip of the wishbone and the breast meat. When during filleting said connection is severed, the fillet at the same time is divided into two parts, thus forming two half fillets. When however the cutting device is shaped in correspondence with FIG. 2b, the filleting will result in one single filleted part.

Figure 3:
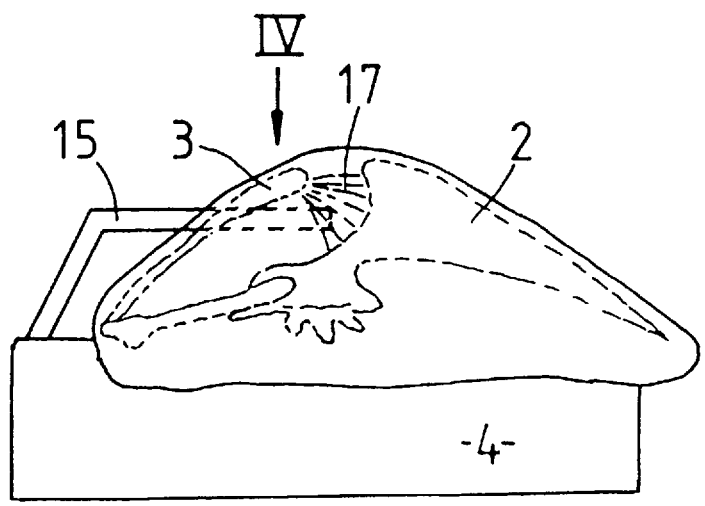
FIG. 3 shows in a side-elevational view part of a different embodiment of the apparatus according to the invention.
Figure 4:
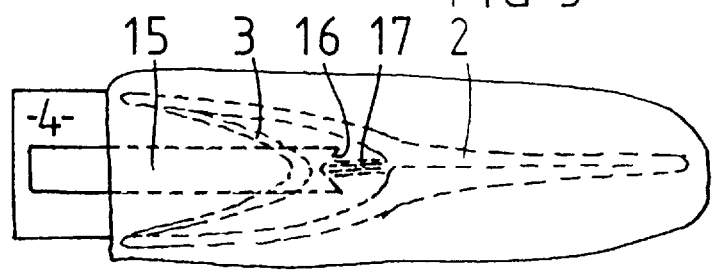
FIG. 4 shows a top plan view according to arrow IV in FIG. 3.

As indicated in FIG. 3 it is possible that the carriage 4 carries a centering plate 15 which at its end (see FIG. 4) is provided with a recess 16 for receiving a tendon 17 extending in the longitudinal medial plane of the breast piece between the tip of the wishbone 3 and the sternum 2. As a result the breast piece 1 can be oriented correctly (that is positioned in parallel with the direction of conveyance) such that the cutting device 7 may operate in an optimized manner. Further it is possible that the centering plate engages the sternum.

The invention is not limited to the embodiment described before, which may be varied widely within the scope of the invention as defined by the claims.

We claim:

1. An apparatus for filleting the breast piece of slaughtered poultry wherein the breast piece includes at least the sternum and wishbone defined by both clavicles, said apparatus comprising:

means for supporting and conveying the breast piece in a conveying direction along a conveying path;

means for cutting loose breast meat from the sternum and wishbone of the breast piece;

said means for cutting loose further comprising a substantially V-shaped cutting device and means for driving said cutting device synchronously with said breast piece along at least a portion of said conveying path and for engaging said breast piece with said cutting device to separate the breast meat adjacent the wishbone.

2. The apparatus as in claim 1, wherein said V-shaped cutting device comprises two parts unconnected at an apex thereof.

3. The apparatus as in claim 2, wherein said V-shaped cutting device comprises a continuous V-shaped member.

4. The apparatus as in claim 1, wherein said means for driving said cutting device comprises a driving apparatus defining a substantially circular track for conveyance of said cutting device, and wherein a portion of the circumference of said circular track coincides with said conveying path of said breast piece.

5. The apparatus as in claim 4, wherein said driving apparatus further comprises arm members rotatable around parallel respective axes, and a connecting arm disposed between said arm members, said cutting device supported on said connecting arm.

6. The apparatus as in claim 5, wherein said means for supporting and conveying the breast piece comprises a carriage supported on an endless conveyor, said carriage configured to receive breast pieces.

7. The apparatus as in claim 6, further comprising a centering plate supported on said carriage, said centering plate disposed to engage the breast piece below the wishbone.

8. The apparatus as in claim 7, wherein said centering plate further comprises a recess defined on a free end thereof, said recess disposed to receive a tendon of the breast piece extending in a longitudinal medial plane between the wishbone and sternum.

9. An apparatus for filleting the breast piece of slaughtered poultry wherein the breast piece includes at least the sternum and wishbone defined by both clavicles, said apparatus comprising:

a conveyor having a plurality of breast piece carriage members that convey breast pieces in a conveying direction along a conveying path defined by said conveyor;

an automatically movable substantially V-shaped cutting device disposed to engage breast pieces carried by said carriage members along a portion of said conveying path to separate breast meat therefrom adjacent the wishbone; and a driving device operably configured with said cutting device, said driving device moving said cutting device synchronously with said breast piece along at least a portion of said conveying path.

10. The apparatus as in claim 9, wherein said driving device comprises rotatable arm members supporting said cutting device, said cutting device traveling in an essentially circular path around parallel axes of said arm members, and wherein a portion of the circumference of said parallel path coincides with at least a portion of said conveying path.

* * * * *